May 28, 1940. A. DEROCHE 2,202,575
ELECTRICAL CABLE AND CONDUCTOR AND PROCESS FOR MANUFACTURING THE SAME
Filed April 27, 1937 6 Sheets-Sheet 1

INVENTOR.
ANDRÉ DEROCHE
By Young, Emery & Thompson
ATTORNEYS

May 28, 1940.　　　　A. DEROCHE　　　　2,202,575
ELECTRICAL CABLE AND CONDUCTOR AND PROCESS FOR MANUFACTURING THE SAME
Filed April 27, 1937　　　6 Sheets-Sheet 2

INVENTOR
ANDRÉ DEROCHE
By Young, Emery v Thompson
ATTORNEYS

May 28, 1940.　　　A. DEROCHE　　　2,202,575
ELECTRICAL CABLE AND CONDUCTOR AND PROCESS FOR MANUFACTURING THE SAME
Filed April 27, 1937　　　6 Sheets-Sheet 4

INVENTOR
ANDRÉ DEROCHE
BY Young, Emery & Thompson
ATTORNEYS

Patented May 28, 1940

2,202,575

UNITED STATES PATENT OFFICE 2,202,575

ELECTRICAL CABLE AND CONDUCTOR AND PROCESS FOR MANUFACTURING THE SAME

André Deroche, Fontgombaut, France

Application April 27, 1937, Serial No. 139,325
In Belgium April 30, 1936

14 Claims. (Cl. 173—244)

The present invention relates to a process for the manufacture of insulated electrical cables and conductors comprising a mineral insulator compressed between the conductor or conductors and an external tubular sheath.

It is known to fill the space between the external tubular sheath and the conductor or conductors with a dry mineral powder serving as an insulator, a plug being used to compress the powder as and when it is introduced but which only causes the tubular sheath to advance after the desired pressure has been obtained. In this way, it is possible to compress the material substantially uniformly and therefore to distribute it uniformly over the whole length of the tubular sheath but this result can only be obtained by means which are relatively complicated. It is also to be noted that this method is not very suitable for the manufacture of relatively long con20 ductors and conductors of large diameter.

The present invention is concerned with a method which enables the conductor or conductors to be placed in position exactly and in a very simple manner and also allows the insulat25 ing material to be distributed at a uniform and adjustable pressure over the whole length of the tubular sheath.

To this effect, according to the invention, the said mineral insulator is introduced under pres30 sure in the external sheath.

Preferably, the mineral insulator is introduced under pressure into the external tubular sheath maintained immovable and causes a movable fluid-tight stopper in the sheath to be moved in the sheath against a constant resistance.

According to one variant of this process, the insulator is introduced in a pasty state into the external tubular sheath and the liquid added for forming the paste is then eliminated by drying.

The pasty condition of the insulating material ensures a uniform pressure throughout the sheath and its regular distribution. The feed pressure which is necessary for distributing the insulating material in a uniform manner is relatively low so that there is no difficulty in drying the paste thoroughly.

The method in accordance with the present invention also has obvious and important advantages over methods in which compressed blocks of dry insulating material are introduced into a sheath. Thus, it allows the manufacture of such blocks, which necessarily involves the use of very high pressure, to be dispensed with; there is no waste due to deterioration (even a partial de55 terioration) of the final blocks; it reduces the amount of manual operation to a minimum; it can be used in connection with conductors of large diameter.

The method in accordance with the invention also has important advantages relatively to the method in which magnesium is converted to magnesium hydroxide in the external sheath. In particular, it is much less costly than the latter method and can be used for conductors of a very much larger diameter.

In this case, the introduction under pressure in the tubular sheath is effected in a powder state. The powder is compressed at the end of said tubular sheath where it is introduced, by pushing it against the mass of material already compressed, until this mass is caused to advance in said tubular sheath in spite of a practically constant resistance opposed to said advancing and by which the rate of compression is determined.

This variant of the method according to the invention is thus substantially different from a known method in which mineral insulating powder is subjected to compression between the conductor or conductors and an external tubular sheath in proportion as it is introduced into said sheath. The method of this invention consisting in compressing powder material by means of a stopper in a tubular body subjected to a constant resistance to the advancement, said compression being effected from a bottom that said tubular sheath presents at the end opposite to the end at which the powder is introduced.

Relatively to the above mentioned known method, this variant of the method according to the invention has namely the advantage of being carried out by using very simple means and of being applicable for the manufacture of large conductors in which the conductors are arranged in their exact position.

In order that the dehydration of the compressed mass of material may be dispensed with, according to the present invention the powder is dried before being subjected to compression and is kept out of contact with air from the moment at which said powder has been dehydrated till the moment at which it is compressed in said tubular sheath.

The present invention relates also to an apparatus for carrying out the method according to the invention.

This apparatus comprises, on the one hand, a device for the introduction under pressure of insulation, on which device one of the extremities of the external tubular sheath is secured and, on the other hand, a movable plug or stopper mounted in a liquid tight manner in said external sheath and subjected to a constant resistance to advancement.

In the case when the apparatus is intended to carry out the variation of the process according to which the insulation is used in a pasty state, this apparatus comprises, on the one hand, a paste feed device to which one of the ends of the external tubular sheath can be secured and in which are provided fluid-tight passages which serve to guide the conductors into the positions they are to occupy in the sheath, and, on the other hand, a movable liquid-tight plug or stopper mounted within the external tubular sheath and subjected to a constant resistance to movement, to which plug or stopper the conductors are fixed in the relative positions they are to occupy relatively to the sheath.

By means of apparatus in accordance with the invention, electric conductors comprising helically wound wires which are generally used as heating elements can be manufactured in a practical and easy manner and with great manufacturing regularity. To this effect the paste feed device comprises a passage for each of the conducting wires and a passage for mandrels movable with the above mentioned plug and on which these wires are to be wound helically, the feed device being also arranged so as to allow a relative rotary movement to take place between the mandrels and the conducting wires to be wound on to them.

The paste feed device may advantageously comprise a passage for guiding a rotary mandrel fixed to the movable plug and around which the conducting wire introduced into the device through an adjacent passage is helically wound by being pulled by means of a finger carried by the mandrel. Preferably, the passage through which the conductor to be helically wound passes is arranged at an angle to the passage provided for the mandrel so as to open out near the latter.

The movable plug is advantageously rotated by means of a rod arranged on the side of the plug remote from that on which the mandrel is arranged, the said rod being capable of being rotated as a function of its axial displacement.

In another form, the feed device comprises an axial passage for a mandrel and one or more passages for conducting wires to be helically wound, the latter passages being formed in a member which can be turned on its axis.

In the case when the apparatus is intended to carry out the variation of the process according to which the insulation is used in a powder state, this apparatus comprises, on the one hand, a device for clamping said tubular sheath arranged in such a way that the end of the sheath that it clamps is placed in the prolongation of a cylinder having the same internal cross section as said tubular sheath and containing a compressing piston provided with passages through which conductors or formers are passing, said cylinder having an inlet opening for the introduction of the powder, and, on the other hand, a stopper subjected to a resistance to movement mounted within said sheath and adapted to slide in the latter from the said clamped end when the push exerted by said compressing piston on the powder exceeds said resistance.

In accordance with an additional and very advantageous feature of the invention, said cylinder is fed with powder by means of a heated hopper and preferably, kept under vacuum by means of an air-tight closure and a connection with a vacuum generator.

The invention has finally for its object electrical cables and conductors obtained by the process according to the invention when the mineral insulator is constituted by alumina.

In order that the invention may be thoroughly understood and be more readily carried into effect, some forms of construction of apparatus in accordance therewith will now be described with reference to the accompanying drawings in which.

Identical elements are designated in the different figures by the same reference characters.

Figure 1:
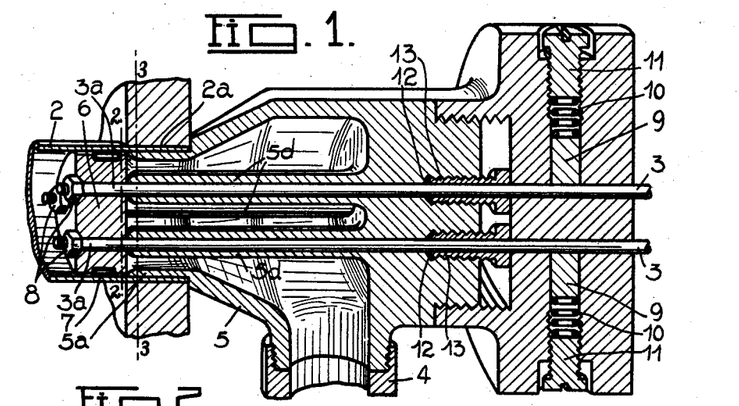
Figure 1 is an axial section in perspective of one form of apparatus in accordance with the invention.
Figure 2:
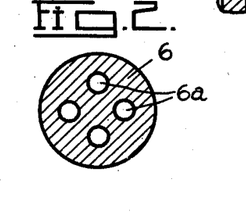
Figures 2 and 3 are cross-sections taken on lines 2—2 and 3—3 respectively of Figure 1.
Figure 3:
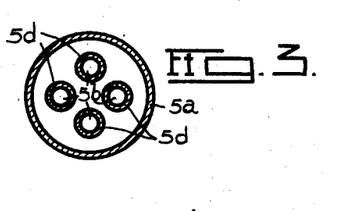

The apparatus shown in Figure 1 is arranged for mounting a tubular metallic sheath 2 about an insulated electrical conductor made up of four wires 3 which are to be separated from the sheath by a compressed mineral insulating material. The insulating material is preferably alumina and is introduced in a pasty form into the tubular sheath. For this purpose, it is brought under pressure through a passage 4 into a paste feed device 5 comprising a neck 5a to which one of the ends 2a of the sheath 2 is fixed. Within the sheath 2 there is disposed a movable plug or stopper 6 of substantially the same diameter as the inside of the sheath. This stopper is provided with a tight joint 7 and serves together with the nuts 8 for fixing the ends 3a of the wires 3. The holes 6a (Figure 2) in the stopper 6 through which the ends 3a of the wires 3 are passed are arranged in the same manner as the passages 5b (Figure 3) formed in bosses 5d on the feed device 5 which serve to guide the wires 3 when the latter are forced through the sheath 2 with the stopper 6.

The stopper 6 is displaced in the tubular sheath by the paste which is introduced under pressure. The resistance to displacement is maintained constant by causing the wires 3 to pass through a friction device which opposes their displacement. This device comprises plungers 9 acted on by springs 10 which can be adjusted by screws 11. A tight joint between the wires 3 and the feed device 5 is ensured by packing rings 12 or the like pressed into their housings by means of screws 13.

When the paste has been introduced under pressure into the sheath 2 and has caused the wires to be placed exactly in the desired position, this paste is progressively dried by being subjected to an increasing temperature which may rise as high as 450° C. Owing to the fact that the whole of the liquid is to be eliminated, it is advantageous to use as little liquid as possible for forming the paste. The paste must, however, be sufficiently fluid to enable the pressure to be evenly distributed at all its points as in the case of a liquid. When the insulating material is very finely powdered magnesia, the paste can be made by adding about 35% by weight of water. The water is mixed with the insulating material to form a paste and is therefore present in such an amount that it can not be confused with the traces of water which powder known as "dry powder" always contains in practice due to its being hygroscopic.

The invention enables electric cables and conductors in which the insulating material consists of alumina to be manufactured industrially. This has not previously been possible. These cables and conductors are of particular practical interest because at high temperatures their insulating power is greater than that of cables and conductors in which magnesia is used as the insulating material.

The paste may be formed by adding to the alumina powder about 35% by weight of water. The amount of water can be varied in accordance with the pressure used. It diminishes with increase in pressure.

When the liquid has been eliminated, the semi-finished conductor can be stretched by hammering, drawing, or any other operation. This increases the compression of the material in the sheath 2.

The final conductor made from such a semi-finished conductor can easily have a length about 100 times the initial length. In the final conductor, the position of the various conducting wires is strictly similar to the original position.

The stopper and the tubular sheath can also be caused to turn about their common axis during the introduction of the paste in order that the conductor or conductors which are not in the axis of the sheath may be wound helically in the insulating mass. The consistency of the paste is such that the conductors are deformed in the paste so as to be wound helically.

Instead of forming the paste by adding the necessary quantity of water to the mineral powder, this powder can be plunged into a boiling 25% boric acid solution. After a certain period of immersion, the paste is separated from the boric acid solution and is dried until it has the required consistency for its introduction under pressure into the sheath 2.

Figure 4:
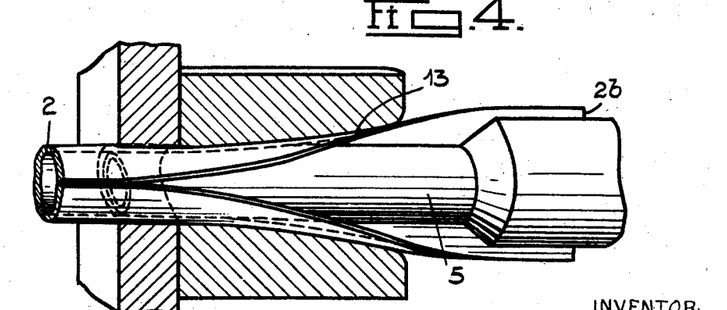
Figure 4 is a perspective view partly in section of a further device in accordance with the invention.

The sheath 2 can be formed continuously as and when the paste emerges from the feed device 5. For example, a flat metallic sheet 2b (Figure 4) can be used for this purpose, which is rolled in a device 13 disposed about the paste feed device 5. The edges of the rolled sheet forming the tubular sheath are, for example, fastened by a suitable device before the place where the paste leaves the feed device 5.

Figure 5:
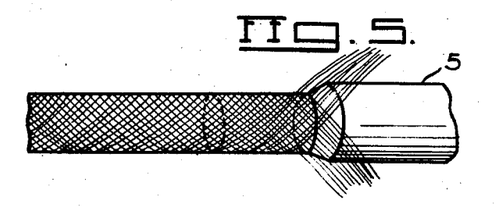
Figure 5 shows diagrammatically a further method of carrying the process of the invention into effect.

The sheath need not necessarily be made of metal. It may be of any other material, of fabric for example. This fabric may also be made in a continuous manner on emergence of the paste 5 from the feed head, for example by weaving or by braiding (see Figure 5).

The resistance to movement of the movable stopper or of the base of the sheath could be effected otherwise than by braking on the conducting wires. Moreover, the conductors need not necessarily be rectilinear wires as has so far been assumed. They may, for example, be wound helically. In this case, the helical wire or wires can be tensioned in position in the sheath 2 before introducing the paste.

Figure 6:
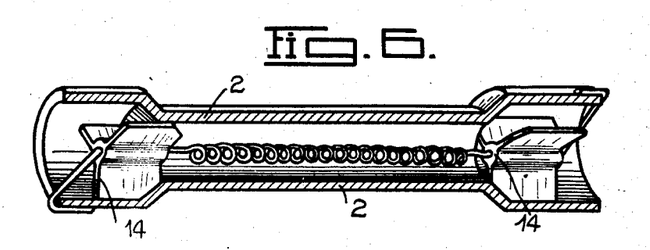
Figure 6 is an axial section through a part of an apparatus in accordance with the invention illustrating a particular phase in the manufacture of a conductor comprising a helically wound wire.

Figure 6 shows a helically wound wire which is maintained centered in the sheath by being mounted in parts 14 which allow the paste to pass around their cores.

Figure 7:
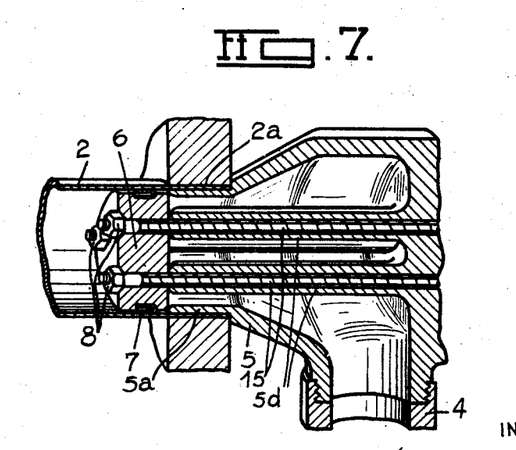
Figure 7 is a perspective view of part of an apparatus illustrating the manufacture of a conductor comprising helically wound elements.

Instead of disposing a wire helically in the sheath 2 in the manner which has just been indicated, it could be mounted on a cylindrical mandrel 15 (Figure 7) introduced into the external tubular sheath 2. The braking of the stopper is then effected by acting on the outside of the stopper. After drying of the paste, this mandrel is removed and the space which is left free is then filled with dry powder.

Figure 8:
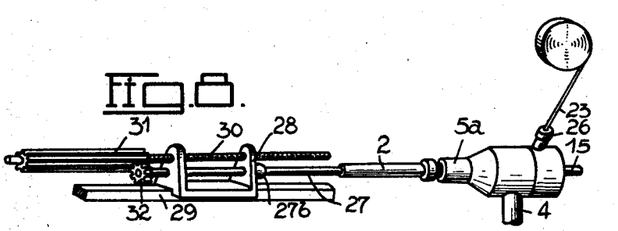
Figure 8 is a perspective view of a device for forming a helically wound heating element.
Figure 9:
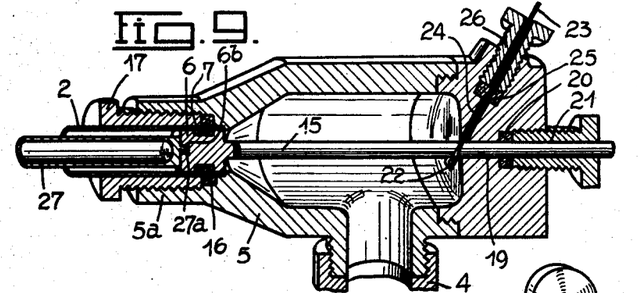
Figure 9 shows on a larger scale and in perspective and in axial section a part of the apparatus of Figure 8.

Figures 8 and 9 show a device comprising a paste feed device 5 into which a paste made from a mineral insulating material such as alumina is introduced under pressure through a passage 4. This paste is pressed into a tubular sheath 2 fixed in the neck 5a. This sheath 2 is strongly compressed by a fluid tight joint 16 (Figure 9) maintained in place by a screw 17 screwed into the neck 5a. A stopper 6 is disposed in the sheath, fluid tightness being ensured by a joint 7. This stopper is integral with the mandrel 15 passing through a passage 19 in the paste feed device. A tight joint is ensured by a packing 20 maintained in place by a screw 21. The mandrel 15 has a finger 22 which serves to draw along a conducting wire 23 which is threaded through a passage 24 in the paste feed device 5. A tight joint is ensured by packing 25 compressed by a screw 26. The passage 24 is disposed obliquely to the passage 19 and ends near the latter. In the paste feed device 5 on the side of the stopper 6 remote from that on which the mandrel 15 is disposed, there is a rod 27 provided with a lug 27a which engages in a notch 6b in the stopper. The rod 27 which tends to be forced back with the stopper 6 by the paste under pressure has a collar 27b which bears against a carriage 28. The latter slides on a guide 29 and is mounted on a screw 30 which turns at the same speed as the rod 27 owing to the provision of a pair of like pinions 31, 32. The result is that when the screw 30 is caused to turn, the rod 27, the stopper 6 and the mandrel 15 make one revolution for each revolution of this screw and these three elements are displaced axially by an amount equal to the pitch of the screw 30. The finger 22 which draws the conducting wire 23 along therefore winds the latter on the mandrel 15 in the form of a helix the pitch of which is equal to the pitch of the screw 30.

When the external tubular sheath 2 is filled with paste, it is detached from the neck 5a and the end containing the stopper 6 and the part of the mandrel 15 on which the conductor wire 23 is not helically wound is cut off. The conducting wire then, owing to its elasticity, tends to move slightly away from the mandrel 15 which facilitates the removal of the latter out of the mass of paste filling the sheath 2. The paste is then progressively dried until completely dehydrated. After the drying, the central hole left by the removal of the mandrel 15 is filled with a fine powder and the ends are, if desired, covered over by suitable means.

The insulating material can be compressed by crushing, forming, hammering, drawing or by any other similar operation.

Figures 10, 11, 12:
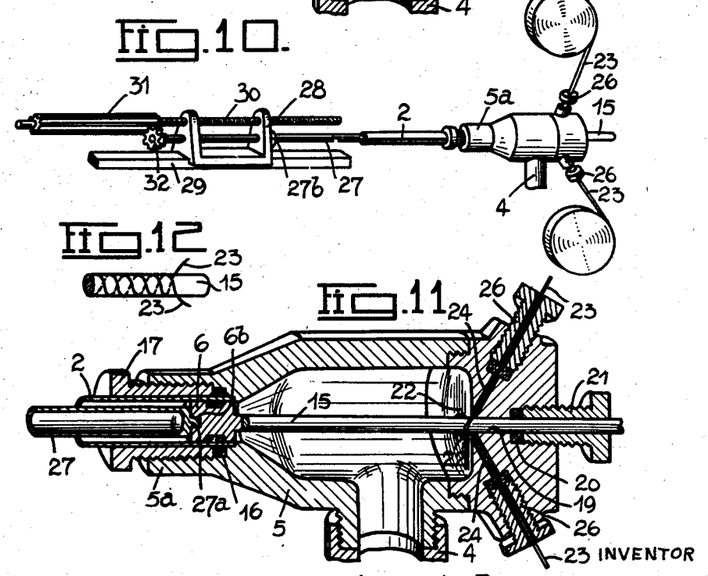
Figures 10 and 11 are views similar to those of Figures 8 and 9 showing a variant of the apparatus in accordance with the invention.
Figure 12 represents diagrammatically the winding of two conductors helically on to one and the same mandrel.

Figures 10 and 11 show a device for simultaneously winding two conducting wires helically about one and the same mandrel. These two conducting wires are brought into the paste feed device through passages 24 both ending near the passages 19 for the mandrel 15.

The latter has two fingers placed diametrically opposite each other by means of which the wires are wound on the mandrel 15 as shown in Figure 12.

Figures 13, 14:
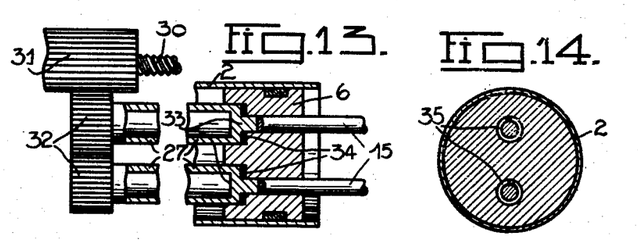
Figure 13 is an axial sectional view through a part of an apparatus in accordance with the invention suitable for the manufacture of a conductor comprising two helically wound wires which are eccentric relatively to the axis of the conductor.
Figure 14 is a cross-section through the conductor obtained by means of the apparatus of Figure 13.

In the apparatus shown in Figure 13, the stopper 6 does not turn and is traversed by two mandrels 15 which are eccentric relatively to the sheath. These mandrels terminate each in a plate 33 which can be rotated by a tube 27. The two tubes 27 have two equal pinions 32 meshing with each other, one being also in engagement with a gear wheel 31. A tight joint between the stopper 6 and plates 33 is ensured by packing 34.

The conductor obtained in this manner has two helical wires 35 arranged as shown in Figure 14. The apparatus of Figure 13 could, of course, comprise more than two eccentric mandrels so as to enable a conductor to be formed having more than two helically wound wires.

Figure 15:
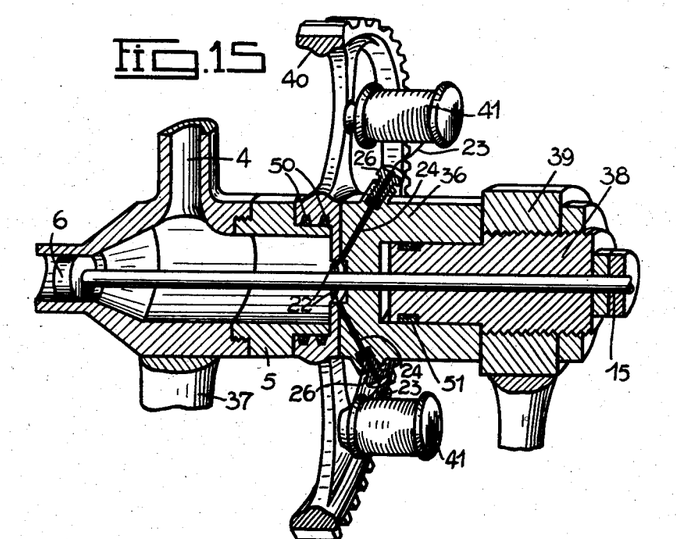
Figure 15 shows a further variant of the apparatus in accordance with the invention.

Figure 15 shows a device in which the helical winding of the conducting wire on to the mandrel is not effected by means of rotation of the latter but as a consequence of the rotation relatively to the mandrel of a member 36 in which are formed passages 24 for the conducting wires 23.

The feed device 5 is mounted in a support 37 and a mandrel 15 is engaged in a fixed member 38 mounted in a support 39. The member 36 is supported by the feed device 5 and by the member 38 and is rotated relatively to these elements through a toothed wheel 40. The conducting wires 23 are carried by bobbins 41 mounted on the wheel 40. The passages 24 end around the axial passage for the mandrel 15.

Figure 16:
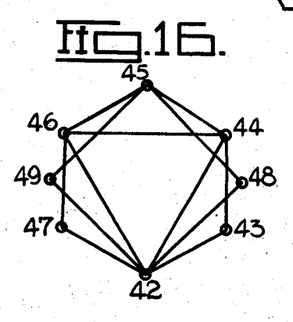
Figure 16 shows diagrammatically an advantageous disposition of the passages for feeding the conducting wires about an axial passage provided for the passage of a mandrel.

Eight of these passages may advantageously be provided as shown in Figure 16. Six of these passages end at the corners 42 to 47 of a regular hexagon, while the other two end at two of the opposite corners of a square, the other two opposite corners 42 and 45 of which coincide with two of the opposite corners of the above mentioned hexagon. This disposition of the passages 24 is very advantageous because, with only eight passages, the uniform winding of the conducting wires can be uniformly wound in five different ways. Indeed, a single wire can be helically wound by using only a particular one of the eight passages 42—49. Two wires can be wound by using two passages leading to any pair of opposite corners. Three wires can be wound by using three passages leading to three corners of one of the equilateral triangles 42, 44, 46 or 43, 45, 47. Four or six wires can be wound by using the passages leading to the respective corners of the square 42, 48, 45, 49 or of the hexagon 42, 43, 44, 45, 46, 47.

The passages 24 through which no wire is passed are, of course, closed by solid screws replacing the corresponding screws 26.

By varying the number of wires wound helically about the mandrel, or mandrels 15, the density of the conducting wires wound helically in the paste can easily be varied. This density can also be varied by using screws 30 and carriages 28 of different pitches.

Figure 17:
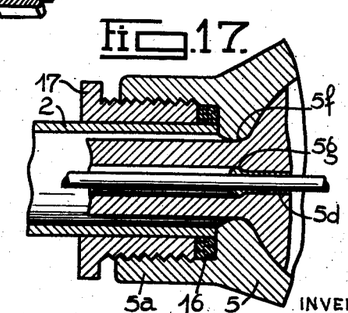
Figure 17 represents diagrammatically a part of an apparatus particularly suitable for the manufacture of a conductor of large diameter.

The bobbins 41 are preferably arranged similarly to the passages 24. The tightness between the feed device 5 and the member 36 and between the members 36 and 38 is ensured easily by packing such as 50 and 51.

Where the insulating layer is to be very thick, the drying of the paste can be made more easy by providing an annular space between the conductor or conductors and the layer of paste and between the layer of paste and the sheath. For forming these annular spaces an apparatus such as that shown in Figure 17 may advantageously be used. This apparatus comprises a paste feed device 5 provided with a draw plate 5f similar to that of a wire drawing mill and having an internal diameter less than that of the external tube 2 which is to form the sheath of the conductor. By using a sufficiently consistent paste, a tube of paste having an external diameter smaller than the internal diameter of the tube 2 is obtained from this draw plate. The conductor 3 also passes through a boss 5d the head 5g of which is expanded. Owing to this expansion, there is also an annular space between the conductor 3 and the paste.

Figures 16A, 18:
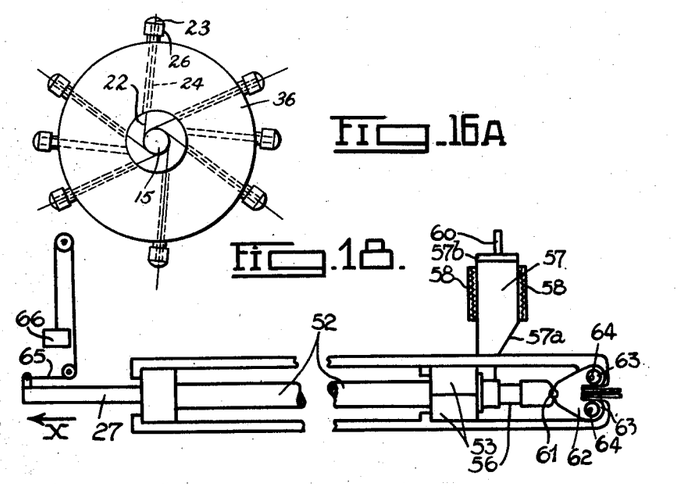
Figure 16a is an end view of the wire feed device diagrammatically shown in Figure 16.
Figure 18 is a side view of an apparatus in accordance with the invention for manufacturing a double electrical conductor.
Figure 19:
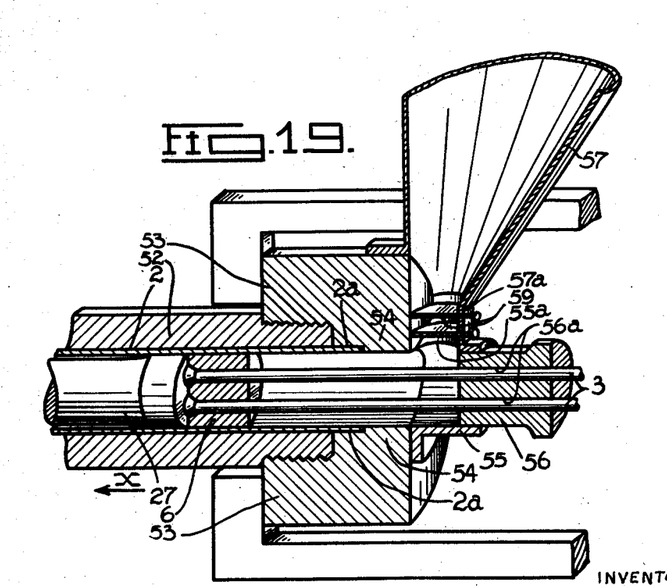
Figure 19 shows on a larger scale a vertical sectional view of the apparatus of Fig. 18.

In Figs. 18 and 19 the external tubular sheath 2 of the conductor which is to be obtained is mounted within a sleeve 52. One end of said sheath is clamped by a device which comprises, for instance, two jaws 53. These jaws 53, when in their clamping position, form at 54 a part of a cylinder, the other part of which is formed by a piece 55. This cylinder has the same cross-section as that of the tubular sheath 2. It is positioned so that said sheath is placed in its prolongation. The cylinder comprises a compressing piston 56 adapted to compress mineral insulating powder falling by successive small quantities into the cylinder 54—55.

Within the external tubular sheath 2 is arranged a plug or stopper 6 adapted to slide in said sheath. To this stopper are secured two wires 3 which pass through the passages 56a provided in the compressing piston 56.

The stopper 6 is subjected to a constant resistance to movement in the direction of the arrow X, that is to say, when said stopper is moving from the end 2a clamped in clamping device 53.

The piece 55 is provided at the upper part thereof with an aperture 55a which serves to the introduction of powder into the cylinder 54—55. Just opposite of said aperture is positioned the outlet duct 57a of a hopper 57. The latter is heated by means of an electrical resistance 58 arranged externally with respect to it. Two valves 59 are provided in the duct 57a, which valves are adapted to be operated so that the quantity of powder contained between said valves is delivered after each stroke of the piston 56 in the direction of the arrow X. The hopper 57 is closed by a cover 57b and is connected by a duct 60 to a vacuum generator.

The compressing piston 56 is connected by means of a ball-joint 61 and of a piece 62 to eccentrics 63 secured to shafts 64 rotating at the same speed and is reciprocated by these eccentrics.

The mineral insulating powder being introduced into the hopper 57, the cover 57b of the latter is closed and the vacuum generator connected to the duct 60 is put in action. The heating of the hopper 57 effects the escape of water which has been absorbed by the powder owing to its contact with air before being introduced into the hopper.

The putting under vacuum of the hopper reduces the tension of the water vapour and is favourable to the feeding of the same. Such a putting under vacuum allows the powder to be completely dehydrated without the powder having to be heated to a very high temperature.

The dehydrated powder is delivered by the operation of valves 59 in small quantities which are introduced one after another into the member 55 forming part of the cylinder 54—55. Subsequently to each introduction of powder into said cylinder, the mass of powder introduced is compressed by the piston 56 by being pushed against the mass already compressed so as to form a single bloc with this mass.

Owing to the displacement of the piston, the whole of compressed powder is also advanced for a certain length within the external tubular sheath 2 in spite of the resistance offered to the movement of the stopper 6. This resistance is obtained for instance, by connecting the end of the rod 27 to a cable 65 to which is suspended a weight 66 determining the rate of compression of the powder.

It is to be noted, that when the compression to which the powder is subjected, is high, this compression does not practically increase during the advancing of the compressed mass within the external tubular sheath owing to the fact that the friction of said mass against the internal surface of said sheath is insignificant if compared with the resistance to the advancing acting on the stopper 6.

The dehydration of the powder is much easier effected before the compression of the powder than after this latter operation. Owing to the fact that after having been dehydrated the powder is compressed without being again put in contact with the atmospheric air, the powder continues to remain completely dry in compressed state and provides therefore for a perfect insulation of conductors as well as for a very high dielectric capacity of the whole.

Figure 20:
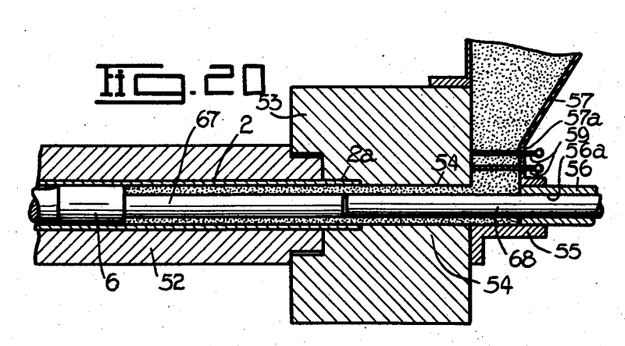
Figures 20, 21 and 22 show vertical sectional views of different variants of an apparatus for the manufacture of a heating element comprising a helical winding of resistance wire.

The Fig. 20 shows an apparatus for the manufacture of a heating element comprising a helical winding. This apparatus serves to manufacture an element having a cavity 67 into which the helical winding may be placed after the insulating layer has been compressed against the external tubular sheath 2. This cavity is obtained by means of a fixed former 68 which passes through a passage 56a provided in the compressing piston 56. This former 68 extends within cylinder 54—55 well beyond the end of the forward stroke of the compressing piston 56. In this manner, the ring of compressed powder is prevented from being disaggregated under the effect of a new compression.

Figure 21:
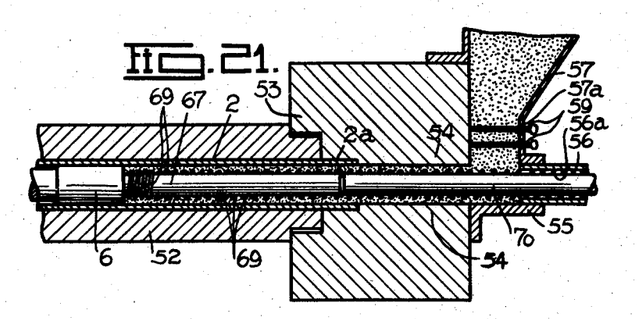

The Fig. 21 shows an apparatus for manufacturing a heating element comprising a helical winding 69. This winding passes within the compressing piston 56 simultaneously with the former 70 and it advances in the external tubular sheath 2 at the same time as the ring of compressed powder in which said winding is embedded. The former 70 which is fixed also extends beyond the end of the forward stroke of the compressing piston 56. This former is drawn out of the winding 69 after this latter and the mineral insulating material have been put in their place within the sheath 2.

Figure 22:
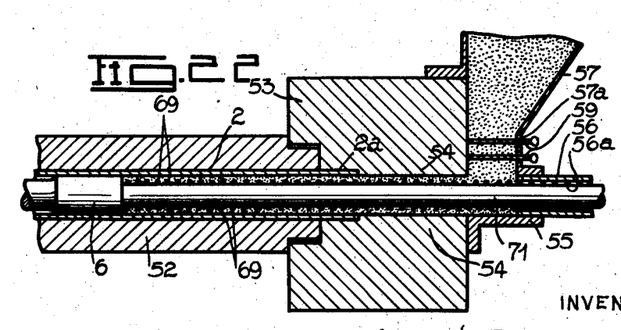

In the apparatus as illustrated in Fig. 22, a former 71 secured to the stopper 6 moves within the external tubular sheath 2 at the same time as the compressed powder ring and the helical winding 69. The former 71 and the winding 69 pass also through the compressing piston 56. Similarly to the former 70 of the Fig. 21 the former 71 is drawn out of the winding 69 after this winding has been placed in position in the sheath 2. The hollow space which remains in the element after the former has been withdrawn, is then filled up with insulating material.

The forms of apparatus described can be modified in various ways. Thus, the number and the distribution of the conducting wires can be varied within wide limits and these wires can be grouped in different ways and they can be of any desired section. The section of these wires can, if desired, be adapted to the external shape of the conductor. If the latter is flat like a ribbon the wire can also be flat. It is moreover, to be noted that the shape of the wire or wires can be modified during manufacture by hammering, drawing, and the like. In particular, the conductor may be given an aerodynamic cross section when the conductor is to serve, for example, as a heating element in a stream of air.

By choosing a suitable consistency for the paste, the latter can be used to coat the sheath internally while forming housings of the desired shape and dimensions. The paste is then introduced alone into the sheath in a manner similar to that explained with reference to Fig. 20 for the powder.

Whatever the manner of introduction of the paste into the sheath may be, the latter may have a shape other than a cylindrical shape.

It is also clear that the method in accordance with the invention can be used for forming elements which are to be used for the supply for electricity in which the loss due to the Joule effect is as low as possible and for making heating elements in which the electrical energy is transformed into heat with the maximum efficiency. In the latter case, in particular, it may be advantageous to make the heating element in the form of a ribbon or a helical wire.

What I claim is:

1. A method of manufacturing electric cables and conductors, comprising a mineral insulating material compressed between the conductors and a tubular external sheath, consisting in disposing a stopper inside said external sheath, causing said stopper to slide inside said sheath, causing said stopper to drive the conductors during its sliding, and introducing the mineral insulating material in said sheath while the stopper and the conductors driven thereby are progressing therein.

2. A method of manufacturing electric cables and conductors, comprising a mineral insulating material compressed between the conductors and a tubular external sheath, consisting in tightly disposing a stopper inside said external sheath, introducing the mineral insulating material under pressure in said sheath so that it pushes the stopper all along the sheath, and causing said stopper to drive the conductors inside the sheath during its sliding.

3. A method of maufacturing electric cables and conductors, comprising a mineral insulating material compressed between the conductors and a tubular external sheath, consisting in tightly disposing a stopper inside said external sheath, drying the powdered mineral insulating material, introducing said material under pressure in said sheath so that it pushes the stopper all along the sheath, and causing said stopper to drive the conductors inside the sheath during its sliding.

4. A method of manufacturing electric cables and conductors, comprising a mineral insulating material compressed between the conductors and a tubular external sheath, consisting in disposing tightly a stopper inside said external sheath, drying the powdered mineral insulating material by heating it in vacuum, introducing said material under pressure in said sheath so that it pushes the stopper all along the sheath, and causing said stopper to drive the conductors inside the sheath during its sliding.

5. Apparatus for manufacturing cables and conductors, comprising a mineral insulating material compressed between the conductors and an external sheath, consisting in a device for feeding the mineral insulating material under pressure into an external tubular sheath, means for fastening said sheath on said device, passages provided in said feeding device for guiding the conductors into the position they occupy in the sheath, a stopper tightly mounted in said sheath, means for displacing said stopper all along the sheath, and means for causing said stopper to drive the conductors in said sheath during its displacement.

6. Apparatus for manufacturing cables and conductors comprising a mineral insulating material compressed between the conductors and an external sheath, consisting in a device for feeding the mineral insulating material under pressure into an external tubular sheath, means for fastening said sheath on said device, passages provided in said feeding device for guiding the conductors into the position they occupy in the sheath, a stopper tightly mounted in said sheath, means for fastening the conductors to said stopper, and means for displacing said stopper all along the sheath.

7. Apparatus for manufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in said sheath, means for sliding said stopper all along the sheath, at least one mandrel fastened to said stopper, means for rotating said mandrel relatively to the feeding device, and means for fastening the ends of the conductors to said mandrel.

8. Apparatus for maufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in said sheath, means for sliding said stopper all along the sheath, a mandrel the axis of which coincides with that of the sheath fastened to said stopper, means for rotating said mandrel relatively to the feeding device, and means for fastening the ends of the conductors on said mandrel so that the conductors are wound helically around it.

9. Apparatus for manufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in said sheath, means for sliding said stopper all along the sheath, a mandrel the axis of which coincides with that of the sheath fastened to said stopper, means for rotating said mandrel relatively to the feeding device, means for guiding the conductors obliquely relatively to the mandrel axis, and means for fastening the ends of the conductors on said mandrel so that the conductors are wound helically around it.

10. Apparatus for manufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in said sheath, means for sliding said stopper all along the sheath, a mandrel the axis of which coincides with that of the sheath fastened to said stopper, means for rotating said mandrel relatively to the feeding device, means provided with glands for guiding the conductors obliquely relatively to the mandrel axis, and means for fastening the ends of the conductors on said mandrel so that the conductors are wound helically around it.

11. Apparatus for manufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in said sheath, a mandrel the axis of which coincides with that of the sheath fastened to said stopper, means for simultaneously rotating said mandrel relatively to the feeding device and to drive it parallelly to the sheath axis, and means for fastening the ends of the conductors on said mandrel so that the conductors are wound helically around it.

12. Apparatus for manufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in the sheath, a mandrel the axis of which coincides with that of the sheath fastened to said stopper, a carriage, means for guiding said carriage parallelly to the sheath axis, a nut provided in said carriage, a rotatable screw fixed lengthwise and engaged in said nut, means for rotatably fastening the mandrel to the carriage, a gear system for transmitting the rotation of the screw to the mandrel, and means for fastening the ends of the conductors on said mandrel so that the conductors are wound helically around it.

13. Apparatus for manufacturing cables and conductors comprising a mineral insulating material compressed between the conductors and an external sheath, consisting in a device for feeding the mineral insulating material under pressure into an external tubular sheath, means for fastening said sheath on said device, a stopper tightly mounted in the sheath, a mandrel the axis of which coincides with that of the sheath fastened to said stopper, a head mounted in the feeding device so as to be able to rotate around the sheath axis, coils for feeding the conductors disposed on said head, channels bored in said head in an oblique direction relatively to said axis for guiding said conductors, means for simultaneously rotating said head and causing the stopper to progress in the sheath, and means for fastening the ends of the conductors on said mandrel so that the conductors are wound helicaly around it.

14. Apparatus for manufacturing cables and conductors comprising a powdered mineral insulating material compressed between the conductors and an external sheath, consisting in a hollow cylinder the inner diameter of which is equal to that of the sheath, means for fastening said sheath to said cylinder so that they register with each other, a stopper tightly disposed in the sheath, means for resisting the displaccment of said stopper inside the sheath, means for fastening the conductors to said stopper, a hopper for the powdered insulating material opening in said hollow cylinder, means for heating the powdered insulating material in said hopper, means for exhausting said hopper, means for feeding the powdered insulating material from the hopper into the hollow cylinder in predetermined amounts, and a piston disposed in the part of said hollow cylinder opposite to the sheath, provided with passages for the conductors and adapted to receive a reciprocatory movement, compress the powdered insulating material against said stopper and cause said stopper and the conductors fastened thereto to progress inside the sheath against the action of the braking means.

ANDRÉ DEROCHE.